(12) United States Patent
Nelson

(10) Patent No.: US 8,496,232 B1
(45) Date of Patent: Jul. 30, 2013

(54) MISTING DEVICE FOR BOATS

(76) Inventor: Matthew T. Nelson, Newark, OH (US)

( * ) Notice: Subject to any disclaimer, the term of this patent is extended or adjusted under 35 U.S.C. 154(b) by 420 days.

(21) Appl. No.: 12/828,638

(22) Filed: Jul. 1, 2010

(51) Int. Cl.
*B01F 3/04* (2006.01)

(52) U.S. Cl.
USPC .......................... 261/5; 261/28; 261/DIG. 43

(58) Field of Classification Search
USPC ............. 261/5, 28, 90, 116, DIG. 3, DIG. 43; 114/343, 382
See application file for complete search history.

(56) References Cited

U.S. PATENT DOCUMENTS

| | | | |
|---|---|---|---|
| 5,330,104 A | 7/1994 | Marcus | |
| 5,403,162 A * | 4/1995 | Chen | 416/246 |
| 5,628,273 A | 5/1997 | Crouse, II | |
| D399,916 S | 10/1998 | Wintering | |
| 5,975,423 A * | 11/1999 | Rice et al. | 239/1 |
| 6,175,969 B1 | 1/2001 | Edwards | |
| 6,272,874 B1 * | 8/2001 | Keeney | 62/240 |
| 6,786,701 B1 * | 9/2004 | Huang et al. | 417/199.1 |
| 7,077,338 B1 | 7/2006 | Williamson | |
| 7,210,637 B1 | 5/2007 | Johnson | |
| 2002/0074674 A1 * | 6/2002 | Keeney | 261/116 |
| 2003/0111746 A1 * | 6/2003 | Stutts | 261/116 |
| 2004/0188542 A1 | 9/2004 | Seann | |
| 2008/0314306 A1 | 12/2008 | Santa Cruz et al. | |

* cited by examiner

*Primary Examiner* — Charles Bushey

(57) ABSTRACT

A misting device for a boat featuring a fan component mounted atop an adjustable fan shaft; a connector disposed on the fan shaft for operatively connecting the misting device to the boat's factory light for obtaining power; a water pump mounted in the fan shaft, the water pump has a water line for inserting into a lake or a water tank; at least one filter component disposed in the water line; and a tubing fluidly connecting the water pump to a nozzle disposed on the fan component, wherein the water pump functions to pump water from the lake or water tank through the tubing to the nozzle where the water is ejected from the nozzle as mist.

5 Claims, 4 Drawing Sheets

MISTING DEVICE FOR BOATS

FIELD OF THE INVENTION

The present invention is directed to a misting and cooling system, more particularly to a misting and cooling system for use on a boat, the system utilizes available lake water or water from a tank.

BACKGROUND OF THE INVENTION

While boating can be very enjoyable, some passengers may become too hot and suffer from heat exhaustion. This can cause boating time to be limited in particularly hot days. The present invention features a misting device for use on a boat. The misting device pumps water from the lake (or from a tank) and creates mist, which is blown onto the passengers via a fan component. The mist from the misting device of the present invention helps keep the individuals on the boat cool, allowing them to remain on the boat for longer time spans. The device combines a forced air system (e.g., pedestal fan) with a water pump for utilizing lake water (or tank water) in addition to a connector for installing the device in a boat after manufacturing.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention features a misting device for a boat. In some embodiments, the misting device comprises a fan component having a plurality of fan blades enclosed in a fan housing, the fan component is mounted atop a fan shaft, wherein the fan shaft is adjustable in height; a connector disposed on the fan shaft for operatively connecting the misting device to a factory light of a boat for obtaining power; a water pump mounted in the fan shaft, the water pump comprises a water line for inserting into a lake or a water tank; a first filter component disposed in the water line, and a second filter disposed in the water line, the first filter component is positioned closer to the pump than the second filter, wherein the second filter is a washable filter housed in a filter cartridge; and a tubing fluidly connecting the water pump to a nozzle disposed on the fan component, wherein the water pump functions to pump water from the lake or water tank through the tubing to the nozzle where the water is ejected from the nozzle as mist.

In some embodiments, the fan component is a 12 volt fan. In some embodiments, the fan component comprises a power switch for turning the fan blades on and off. In some embodiments, the fan shaft is about ⅜ inch in diameter. In some embodiments, the water pump is a 12 volt 50 psi pump.

DESCRIPTION OF PREFERRED EMBODIMENTS

Figure 1:
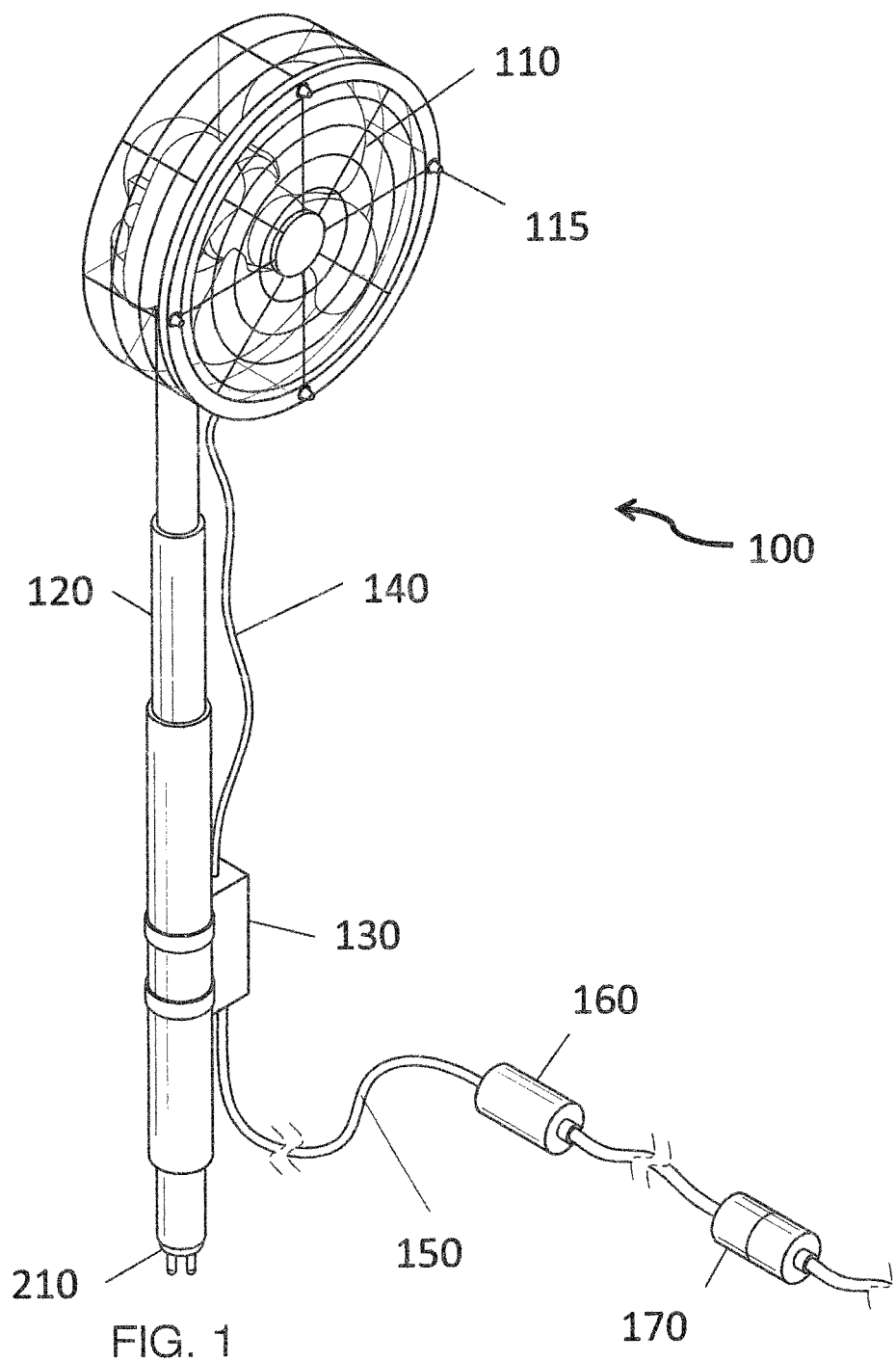
FIG. 1 is a perspective view of the misting device of the present invention.

Referring now to FIGS. 1-5, the present invention features a misting device 100 for use on a boat. The misting device 100 pumps water from the lake (or from a tank) and creates mist. The device combines a forced air system (e.g., pedestal fan) with a water pump for utilizing lake water (or tank water) in addition to a connector for installing the device in a boat after manufacturing.

The device 100 of the present invention comprises a fan component 110 (e.g., a 12 volt fan). Fans are well known to one of ordinary skill in the art. For example, the fan component 110 has a plurality of rotating blades enclosed in a fan housing. The fan component 110 comprises a power switch 118 for turning the fan blades on and off. The fan component 110 is mounted atop a fan shaft 120 (e.g., PVC tubing, e.g., ⅜ inch diameter). In some embodiments, the fan shaft 120 is adjustable in height. For example, the fan shaft 120 may comprise telescopic components adapted to expand and collapse (and be secured at a desired height via a locking means.

The misting device 100 of the present invention further comprises a water pump 130 (e.g., 12 volt, 50 psi pump) fluidly connected to the fan component 110 via tubing 140. The pump 130 may be mounted in the fan shaft 120 (e.g., see FIG. 1). In some embodiments, a nozzle 115 is mounted on the end of the tubing 140 in the fan component 110 such that when water is ejected from the nozzle 115 the fan component 110 blows the water, creating mist.

Figure 2:
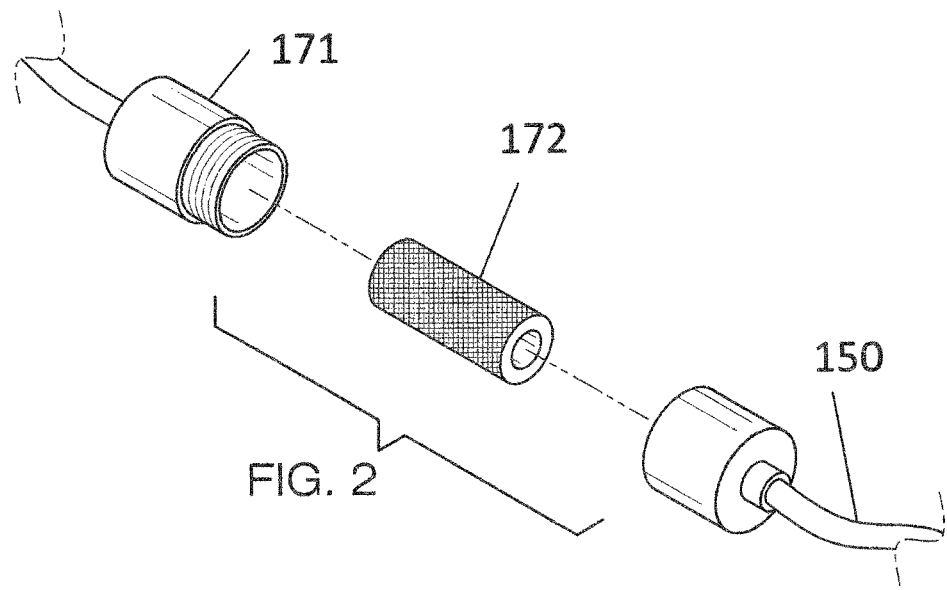
FIG. 2 is an exploded view of components of the misting device of FIG. 1.
Figure 3:
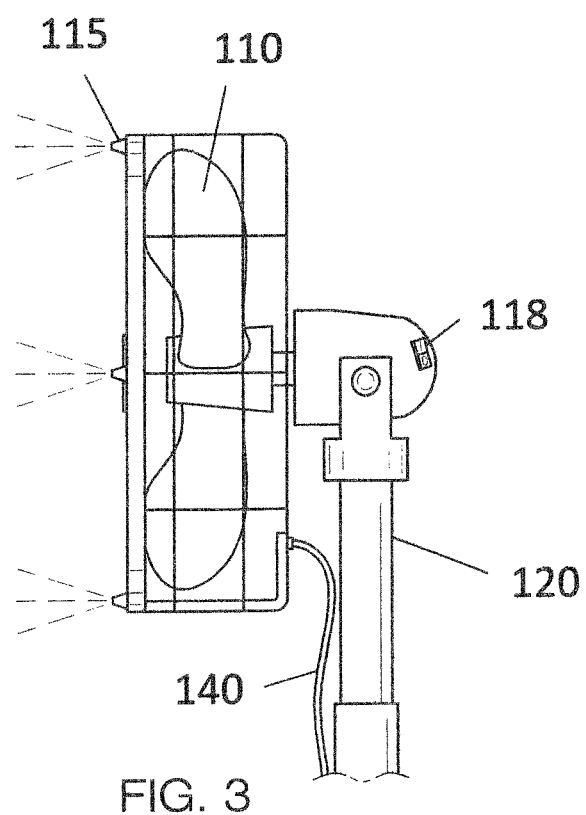
FIG. 3 is a side view of the misting device of FIG. 1.
Figure 4:
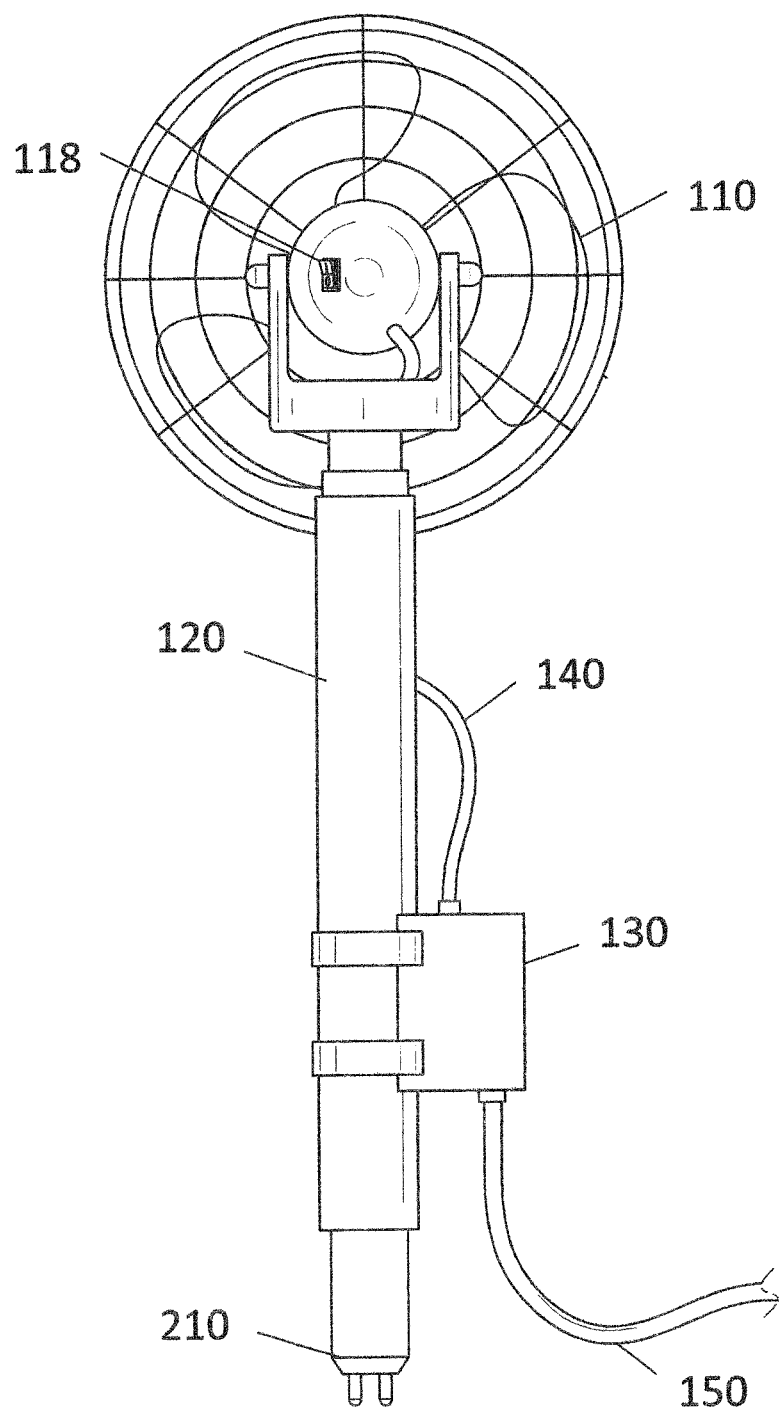
FIG. 4 is a back view of the misting device of FIG. 1.

The pump 130 comprises a water line 150, which is inserted into the lake or a water tank (e.g., fresh water tank on board). Disposed in the water line 150 is a first filter component 160 (e.g. 5 micron filter). In some embodiments, a second filter 170 (e.g., a washable filter) is disposed in the water line 150. The first filter component 160 is positioned closer to the pump 130 than the second filter component 170. As shown in FIG. 2, in some embodiments, the second filter 170 comprises a filter housing 171 that encloses a washable filter cartridge 172. The present invention is not limited to this configuration.

Figure 5:
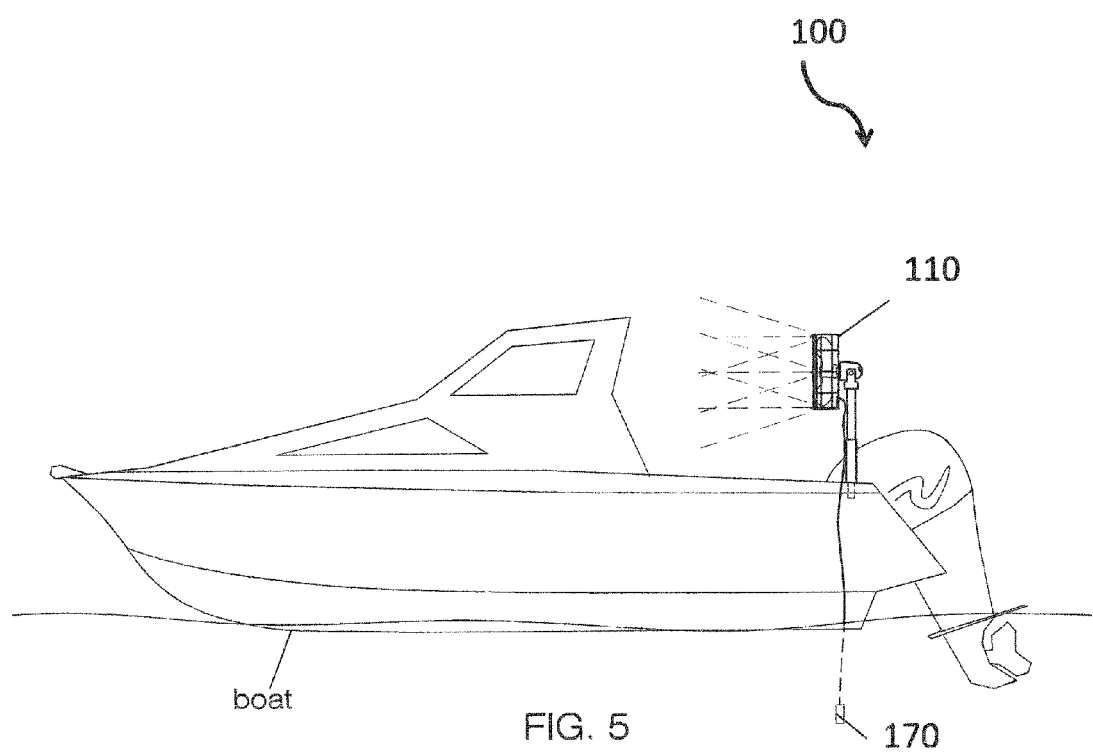
FIG. 5 is an in-use view of the misting device of FIG. 1.

Disposed on the second end of the fan shaft 120 is a connector 210, which operatively connected the device 100 to the factory light of the boat, thus the device 100 of the present invention utilizes the factory electric system as the power source. FIG. 5 shows the device installed in a boat and the water line 150 dropped into the lake.

The disclosures of the following U.S. Patents are incorporated in their entirety by reference herein: U.S. Pat. No. 7,210,637; U.S. Pat. Application No. 2004/0188542; U.S. Pat. Application No. 2008/0314306; U.S. Pat. No. 6,175,969; U.S. Pat. No. 5,628,273; U.S. Pat. No. 5,330,104; U.S. Pat. No. 7,077,338.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A misting device comprising:
   (a) a fan component having a plurality of fan blades enclosed in a fan housing, the fan component is mounted atop a fan shaft, wherein the fan shaft is adjustable in height;
   (b) a connector disposed on the fan shaft for operatively connecting the misting device to a factory light of a boat for obtaining power;
   (c) a water pump mounted in or on the fan shaft, the water pump comprises a water line for inserting into a lake or a water tank;
   (d) a first filter component disposed in the water line, and a second filter disposed in the water line, wherein the first filter component comprises a 5 micron filter and is positioned between the pump and the second filter, wherein the second filter is a washable filter housed in a filter cartridge; and
   (e) a tubing fluidly connecting the water pump to a plurality of nozzles radially disposed on the fan component, wherein the water pump functions to pump water from the lake or water tank through the tubing to the nozzles where the water is ejected from the nozzles as mist.

2. The misting device of claim 1, wherein the fan component is a 12 volt fan.

3. The misting device of claim 1, wherein the fan component comprises a power switch for turning the fan blades on and off.

4. The misting device of claim 1, wherein the fan shaft is about 3/8 inch in diameter.

5. The misting device of claim 1, wherein the water pump is a 12 volt 50 psi pump.

* * * * *